US011952105B2

(12) United States Patent
Giroux et al.

(10) Patent No.: US 11,952,105 B2
(45) Date of Patent: *Apr. 9, 2024

(54) SYSTEM AND METHOD FOR FLIGHT CONTROL IN ELECTRIC AIRCRAFT

(71) Applicant: BETA AIR, LLC, South Burlington, VT (US)

(72) Inventors: Andrew Giroux, Georgia, VT (US); Timothy Gerard Richter, Wynantskill, NY (US); Nicholas Moy, Burlington, VT (US)

(73) Assignee: BETA Technologies, Inc., South Burlington, VT (US)

( * ) Notice: Subject to any disclaimer, the term of this patent is extended or adjusted under 35 U.S.C. 154(b) by 167 days.

This patent is subject to a terminal disclaimer.

(21) Appl. No.: 17/349,631

(22) Filed: Jun. 16, 2021

(65) Prior Publication Data

US 2022/0289363 A1  Sep. 15, 2022

Related U.S. Application Data

(63) Continuation-in-part of application No. 17/197,427, filed on Mar. 10, 2021, now Pat. No. 11,142,333.

(51) Int. Cl.
*B64C 13/50* (2006.01)
*B64C 13/16* (2006.01)
(Continued)

(52) U.S. Cl.
CPC ............ *B64C 13/16* (2013.01); *B64C 13/503* (2013.01); *H04W 4/40* (2018.02); *H04W 72/569* (2023.01); *B64C 29/0033* (2013.01)

(58) Field of Classification Search
CPC ... B64C 13/503; B64C 13/16; B64C 29/0033; B64D 27/24; H04W 72/569; H04W 4/40
See application file for complete search history.

(56) References Cited

U.S. PATENT DOCUMENTS 9,958,874 B2 * 5/2018 Yu .................. G05D 1/0858
10,281,890 B1 * 5/2019 Kroo ................ G05D 1/0858
(Continued)

OTHER PUBLICATIONS

Wang et al., Design and experiment of rudder load simulator for high dynamic aircraft, 2009, IEEE, p. 2573-2577 (Year: 2009).*
(Continued)

*Primary Examiner* — McDieunel Marc
(74) *Attorney, Agent, or Firm* — Lee & Hayes, P.C.

(57) ABSTRACT

A system for flight control in electric aircraft includes a flight controller configured to provide an initial vehicle torque signal including a plurality of attitude commands. The system includes a mixer configured to receive the initial vehicle torque signal and a vehicle torque limit, receive prioritization data including a prioritization datum corresponding to each of the plurality of attitude command, determine a plurality of modified attitude commands as a function of the vehicle torque limit, the attitude commands, and the prioritization data, generate, as a function of modified attitude commands, an output torque command including the initial vehicle torque signal adjusted as a function of the vehicle torque limit, generate, as a function of the output torque command, a remaining vehicle torque. The system includes a display, wherein the display is configured to present, to a user, the remaining vehicle torque and the output torque command.

20 Claims, 8 Drawing Sheets

(51) Int. Cl.
*H04W 4/40* (2018.01)
*H04W 72/566* (2023.01)
*B64C 29/00* (2006.01)

(56) References Cited

U.S. PATENT DOCUMENTS 11,142,333 B1 * 10/2021 Richter ................ G05D 1/0858
11,679,867 B2 * 6/2023 Giroux ................ H04W 72/569
701/3

OTHER PUBLICATIONS

Donovan, Development of a flight controller for the delta space research vehicle, 1960, IEEE, p. 406-411 (Year: 1960).*
Hon-Qi et al., A Design of Flight Control System for Four-Rotor Micro Aerial Vehicle, 2015, IEEE, p. 1447-1451 (Year: 2015).*
Liu et al., An L1 adaptive roll and pitch angle controller for quadrotors, 2016, IEEE, p. 2437-2478 (Year: 2016).*
Zhang et al., Insulators Recognition for 220kv/330kv High-voltage Live-line Cleaning, 2006, IEEE, p. 1-4 (Year: 2006).*
Hossein et al., The design, implementation, and stability analysis of a human-inspired dome-tethered robot, 2014, IEEE, p. 648- 653 (Year: 2014).*

* cited by examiner

SYSTEM AND METHOD FOR FLIGHT CONTROL IN ELECTRIC AIRCRAFT

CROSS-REFERENCE TO RELATED APPLICATIONS

This application is a continuation-in-part of Non-provisional application Ser. No. 17/197,427 filed on Mar. 10, 2021 and entitled "SYSTEM AND METHOD FOR FLIGHT CONTROL IN ELECTRIC AIRCRAFT," the entirety of which is incorporated herein by reference.

FIELD OF THE INVENTION

The present invention generally relates to the field of electric aircraft. In particular, the present invention is directed to system and method for flight control in electric aircraft.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of control. This is particularly problematic as it compounds the already daunting challenges to designers and manufacturers developing the aircraft for manned and/or unmanned flight in the real world.

SUMMARY OF THE DISCLOSURE

In an aspect, a system for flight control in electric aircraft includes a flight controller, wherein the flight controller is configured to provide an initial vehicle torque signal comprising a plurality of attitude commands. The system includes a mixer, wherein the mixer includes circuitry configured to receive the initial vehicle torque signal, receive at least a vehicle torque limit, receive a plurality of prioritization data, the plurality of prioritization data including a prioritization datum corresponding to each of the plurality of attitude command, determine a plurality of modified attitude commands as a function of the at least a vehicle torque limit, the plurality of attitude commands, and the plurality of prioritization data, generate, as a function of modified attitude commands, an output torque command, wherein the output torque command includes the initial vehicle torque signal adjusted as a function of the at least a vehicle torque limit, generate, as a function of the output torque command, a remaining vehicle torque. The system includes a display, wherein the display is configured to present, to a user, the remaining vehicle torque and the output torque command.

In another aspect, a method for flight control in electric aircraft includes providing, at the flight controller, an initial vehicle torque signal comprising at least an attitude command, receiving, at the mixer, the initial vehicle torque signal including a plurality of attitude commands, receiving, at the mixer, at least a vehicle torque limit, receiving, at the mixer, a plurality of prioritization data including a prioritization datum corresponding to each of the plurality of attitude commands, determining, at the mixer, a plurality of modified attitude commands as a function of the at least a vehicle torque limit, the plurality of attitude commands, and the plurality of prioritization data, generating, at the mixer, as a function of modified attitude commands, an output torque command, wherein the output torque command includes the initial vehicle torque signal adjusted as a function of the at least a vehicle torque limit, generating, at the mixer, as a function of the output torque command, a remaining vehicle torque, and displaying to a user the remaining vehicle torque and the output torque command.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to embodiments oriented as shown for exemplary purposes in FIG. 8. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
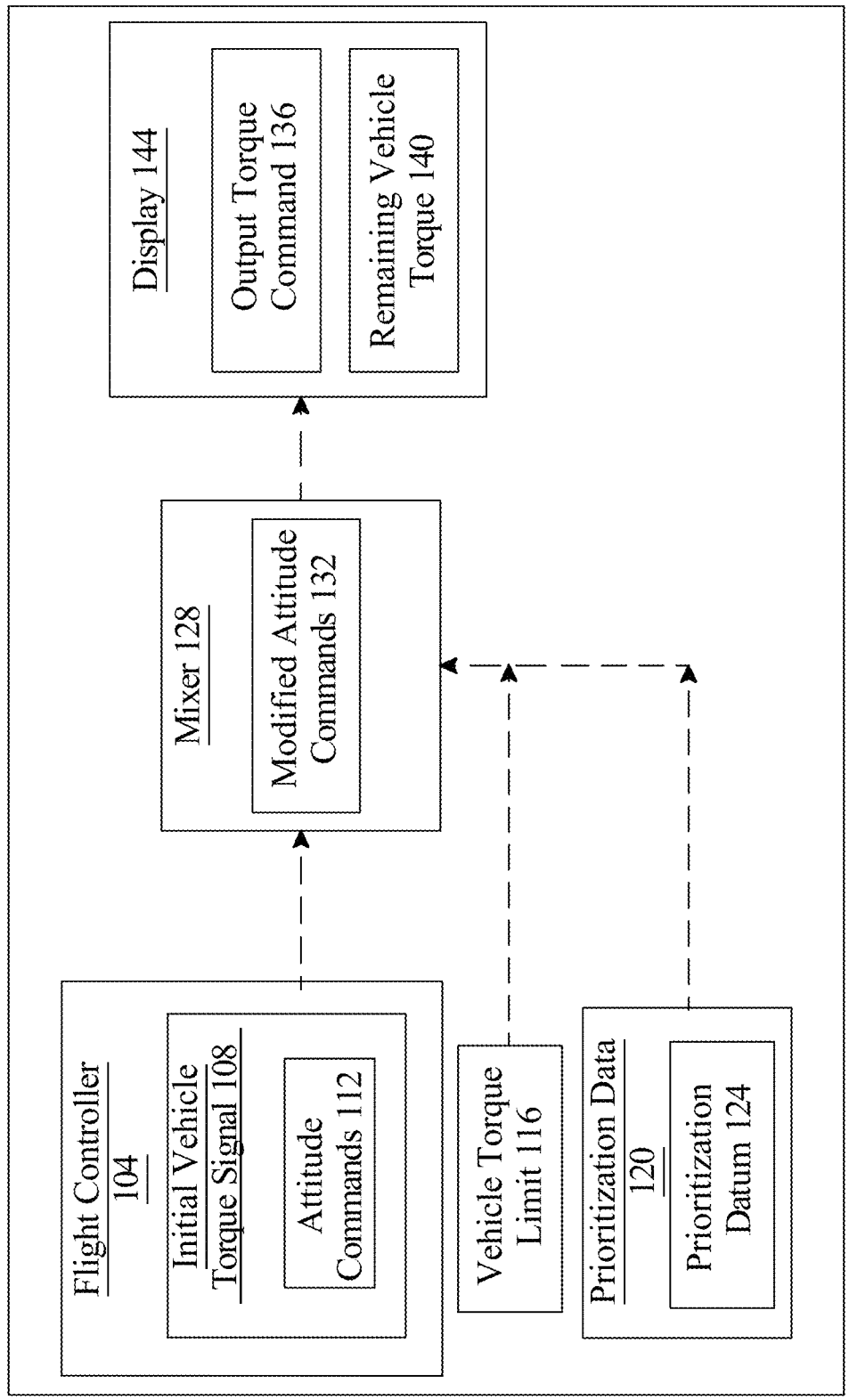
FIG. 1 is a block diagram illustrating an exemplary embodiment of a system for flight control in electric aircraft.

Still referring FIG. 1, system 100 may include a computing device, which may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing Device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

Still referring to FIG. 1, computing device that may be present in system 100 may be designed and/or configured to perform any method, method step, or sequence of method steps in any embodiment described in this disclosure, in any order and with any degree of repetition. For instance, Computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 configured for use in electric aircraft is presented. System 100 includes flight controller 104 configured to provide initial vehicle torque signal 108 for at least a propulsor. Flight controller 104 may be a computing device as previously disclosed. Flight controller 104 may be a processor configured to control the output of a plurality of propulsors in response to inputs. Inputs to this system may include pilot manipulations of physical control interfaces, remote signals generated from electronic devices, voice commands, physiological readings like eye movements, pedal manipulation, or a combination thereof, to name a few. Flight controller 104 may include a proportional-integral-derivative (PID) controller. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. PID controllers may automatically apply accurate and responsive correction to a control function in a loop, such that over time the correction remains responsive to the previous output and actively controls an output. Flight controller 104 may include damping, including critical damping to attain the desired setpoint, which may be an output to a propulsor in a timely and accurate way.

Still referring to FIG. 1, flight controller 104 may be implemented consistently with any flight controller as described herein. Flight controller 104 is configured to provide an initial vehicle torque signal 108 comprising a plurality of attitude commands 112. Initial vehicle torque signal 108 may include a desired change in aircraft trajectory as inputted by an onboard or offboard pilot, remotely located user, one or more computing devices such as an "autopilot" program or module, any combination thereof, or the like. Initial vehicle torque signal 108 may include without limitation one or more electrical signals, audiovisual signals, physical indications of desired vehicle-level torques and forces, or the like. "Trajectory", for the purposes of this disclosure is the path followed by a projectile or vehicle flying or an object moving under the action of given forces. Trajectory may be altered by aircraft control surfaces and/or one or more propulsors working in tandem to manipulate a fluid medium in which the object is moving through. Initial vehicle torque signal 108 may include a signal generated from manipulation of a pilot input control consistent with the entirety of this disclosure.

Further referring to FIG. 1, flight controller 104 may include one or more circuit elements communicatively coupled together. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

Still referring to FIG. 1, at least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. At least pilot control may be physically located in the cockpit of the aircraft or remotely located outside of the aircraft in another location communicatively connected to at least a portion of the aircraft. "Communicatively connect", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, initial vehicle torque signal 108.

With continued reference to FIG. 1, initial vehicle torque signal 108, which is provided by flight controller 104, includes a plurality of attitude commands 112. "Attitude", for the purposes of this disclosure, is the relative orientation of a body, in this case an electric aircraft, as compared to earth's surface or any other reference point and/or coordinate system. Attitude is generally displayed to pilots, personnel, remote users, or one or more computing devices in an attitude indicator, such as without limitation a visual representation of the horizon and its relative orientation to the aircraft. Plurality of attitude commands 112 may indicate one or more measurements relative to an aircraft's pitch, roll, yaw, or throttle compared to a relative starting point. One or more sensors may measure or detect the aircraft's attitude and establish one or more attitude datums. An "attitude datum", for the purposes of this disclosure, refers to at least an element of data identifying and/or a pilot input or command. At least a pilot control may be communicatively connected to any other component presented in system, the communicative connection may include redundant connections configured to safeguard against single-point failure. Plurality of attitude commands 112 may indicate a pilot's instruction to change the heading and/or trim of an electric aircraft. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure, hereinbelow. "Pitch", for the purposes of this disclosure refers to an aircraft's angle of attack, that is the difference between the aircraft's nose and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor. Initial vehicle torque signal 108 may include an electrical signal. At least an aircraft command 104 may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into at initial vehicle torque signal 108 configured to be transmitted to another electronic component. Plurality of attitude commands 112 may include a total attitude command datum, such as a combination of attitude adjustments represented by one or a certain number of combinatorial datums. Plurality of attitude commands 112 may include individual attitude datums representing total or relative change in attitude measurements relative to pitch, roll, yaw, and throttle.

With continued reference to FIG. 1, vehicle-level torque commands such as initial vehicle torque signal 108 may be translated into propulsor commands such as output torque command 136 through modified attitude commands 132 in mixer 128 such that onboard electronics solve systems of equations in pitch moment, roll moment, yaw moment, and collective force may send each of a plurality of propulsors signals to achieve the desired vehicle torque. It should be noted that "collective force" may additionally or alternatively be called "assisted lift force" and that this terminology does not alter the meaning of either "collective force" or "assisted lift force" as used herein. Here, "desired vehicle torque" is directly related to initial vehicle torque signal 108 consistent with the disclosure. It should be noted by one of ordinary skill in the art that initial vehicle torque signal 108 may be received from flight controller 104 as a calculated input, user input, or combination thereof. Flight controller 104 may include and/or communicate with any computing device, including without limitation a microcontroller, microprocessor, digital signal processor (DSP) and/or system on a chip (SoC). Flight controller 104 may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller 104 may be designed and configured to operate electronic aircraft via fly-by-wire. Flight controller 104 is communicatively connected to each propulsor; as used herein, flight controller 104 is communicatively connected to each propulsor where flight controller 104 is able to transmit signals to each propulsor and each propulsor is configured to modify an aspect of propulsor behavior in response to the signals. As a non-limiting example, flight controller 104 may transmit signals to a propulsor via an electrical circuit connecting flight controller 104 to the propulsor; the circuit may include a direct conductive path from flight controller 104 to propulsor or may include an isolated coupling such as an optical or inductive coupling. Alternatively, or additionally, flight controller 104 may communicate with a propulsor using wireless communication, such as without limitation communication performed using electromagnetic radiation including optical and/or radio communication, or communication via magnetic or capacitive coupling. Vehicle controller may be fully incorporated in an electric aircraft containing a propulsor and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively connect flight controller 104 to propulsors. Persons skilled in the art, upon reviewing the entirety of this disclosure, will be aware of various ways to monitor resistance levels and apply resistance to linear thrust control, as used and described herein.

With continued reference to FIG. 1, system 100 includes mixer 128 configured to receive initial vehicle torque signal 108 including plurality of attitude commands 112. Receiving may include receiving one or more electrical signals transmitted wirelessly or through a wired connection. Mixer 128 may be one or more computing devices configured to perform torque allocation to one or more propulsors in an electric aircraft to alter pitch, roll, yaw, and lift (or throttle). Initial vehicle torque signal 108 may be any initial vehicle torque signal as described herein. Initial vehicle torque signal 108 may represent one or more elements of data describing current, past, or future aircraft orientations relative to the earth's horizon, or attitude, thus including a plurality of attitude commands 112 as described herein.

With continued reference to FIG. 1, a "mixer", for the purposes of this disclosure, may be a component that takes in at least an incoming signal, such as initial vehicle torque signal 108 including plurality of attitude commands 112 and allocates one or more outgoing signals, such as modified attitude commands 132 and output torque command 136, or the like, to at least a propulsor, flight component, or one or more computing devices connected thereto. One of ordinary skill in the art, after reading the entirety of this disclosure, would be aware that a mixer, as used herein, may additionally or alternatively be described as performing "control allocation" or "torque allocation". For example, mixer 128 may take in commands to alter aircraft trajectory that requires a change in pitch and yaw. Mixer 128 may allocate torque to at least one propulsor (or more) that do not independently alter pitch and yaw in combination to accomplish the command to change pitch and yaw. More than one propulsor may be required to adjust torques to accomplish the command to change pitch and yaw, mixer 128 would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure. Mixer 128 may be a nonlinear program-based mixer that create new frequencies from two signals applied to it. In most applications, two signals are applied to mixer 128, and it produces new signals at the sum and difference of the original frequencies. Other frequency component may also be produced in a practical frequency mixer. One of ordinary skill in the art would understand that, in general, mixers are widely used to shift signals from one frequency range to another, a process known as heterodyning. Another form of mixer operates by switching, with the smaller input signal being passed inverted or noninverted according to the phase of the local oscillator (LO). This would be typical of the normal operating mode of a packaged double balanced mixer, with the local oscillator drive considerably higher than the signal amplitude. Mixer 128 may be consistent with any mixer described herein. Mixer 128 may be implemented using an electrical logic circuit. "Logic circuits", for the purposes of this disclosure, refer to an arrangement of electronic components such as diodes or transistors acting as electronic switches configured to act on one or more binary inputs that produce a single binary output. Logic circuits may include devices such as multiplexers, registers, arithmetic logic units (ALUs), computer memory, and microprocessors, among others. In modern practice, metal-oxide-semiconductor field-effect transistors (MOSFETs) may be implemented as logic circuit components. Mixer 128 may be implemented using a processor. Mixer 128 is configured to receive the initial vehicle torque signal 108 for at least a propulsor from flight controller 104. Mixer 128 solves at least an optimization problem. At least an optimization problem may include solving the pitch moment function that may be a nonlinear program.

With continued reference to FIG. 1, system 100 includes mixer 128 configured to receive at least a vehicle torque limit 116. Vehicle torque limit 116 may include one or more elements of data representing maxima, minima, or other limits on vehicle torques, forces, attitudes, rates of change, or a combination thereof. Vehicle torque limit 116 may include individual limits on one or more propulsors, one or more flight components, structural stress or strain, energy consumption limits, or a combination thereof. Vehicle torque limit 116 may include attitudes in which aircraft cannot enter such as maximum or minimum pitch angle or pitch angle rate of change, vehicle torque limit 116 in a non-limiting example, may include a limit on one or more propulsors calculated in order to keep aircraft within a pitch angle range. Vehicle torque limit 116 may be a relative limit, as in a non-limiting example, may include maximum lift from one or more propulsors based on environmental factors such as air density. Vehicle torque limits 116 may include graphical limits, such as points or lines on a graphical representation of certain attitudes, such as pitch vs. lift, or pitch vs. roll, for example. Vehicle torque limits 116 may be displayed to a pilot, user, or be embedded in the controls such that a pilot is unable to maneuver an aircraft that would violate a vehicle torque limit 116 as described herein.

With continued reference to FIG. 1, mixer 128 includes circuitry configured to receive a plurality of prioritization data 120 including a prioritization datum 124 corresponding to each of the plurality of attitude commands 112. Plurality of prioritization data 120 may include one or more elements of data representing relative weight, importance, preservation, or otherwise ranking of attitudes of an aircraft. Prioritization datum 124 may be one of the plurality of prioritization data 120, such as the relative importance of each attitude command 112. For example, and without limitation, prioritization datum 124 may include a coefficient associated with the pitch attitude command, this coefficient would determine a rank of preservation of pitch attitude command relative to roll, yaw, and lift. That is to say that if a pilot commands aircraft to change pitch and yaw, and the command would violate vehicle torque limit 116, the mixer 128 would determine the relatively higher importance of pitch, and preserve the pitch command, while compromising the yaw command, according to available power to the propulsor, this process will be detailed in further depth with regard to FIGS. 3A and 3B.

With continued reference to FIG. 1, mixer 128 is configured to determine a plurality of modified attitude commands 132 as a function of the at least a vehicle torque limit 116, plurality of attitude commands 112 and the plurality of prioritization data 120. Mixer 128 may allocate torque to plurality of propulsors such that attitude commands 112 are adjusted as a function of prioritization data 120 and vehicle torque limits 116. Modified attitude commands 132 may be prioritized to preserve more important attitude commands, for instance as represented by prioritization data 120, when the vehicle torque limits 116 precludes all attitude commands 112 from being executed exactly as inputted. Modified attitude commands 132 may include one or more attitude commands within the vehicle torque limits 116. Mixer 128 may generate modified attitude command 132 for at least a propulsor as a function of solving the at least an optimization problem. Mixer 128 may transmit modified attitude command 132 to at least a propulsor. Modified attitude command 132 may be used iteratively as a torque limit in a control loop such that system 100 can adjust at a certain rate to outside conditions such as environmental conditions, namely airspeed, altitude, attitude, air density, and the like.

With continued reference to FIG. 1, mixer 128 is configured to generate, as a function of modified attitude commands 132, output torque command 136. Output torque command 136 may include one or more signals to one or more propulsors indicating the torque to be produced at the one or more propulsors to achieve the modified attitude commands 132.

For example, and without limitation, where modified attitude command 132 includes a pitch up of 5 degrees and a change in yaw to the right of 2 degrees, output torque command 136 may indicate the output each propulsor must output individually to maneuver the aircraft in tandem. Output torque command 136 may include electrical signals consistent with the entirety of this disclosure, which may be generated based on the torque command in any manner that may occur to a person skilled in the art upon reviewing the entirety of this disclosure.

With continued reference to FIG. 1, mixer 128 may be configured to generate, as a function of output torque command 136, remaining vehicle torque 140. Remaining vehicle torque 140 may include torque available at each of a plurality of propulsors at any point during an aircraft's entire flight envelope, such as before, during, or after a maneuver. For example, and without limitation, output torque command 136 may indicates torque a propulsor must output to accomplish a maneuver; remaining vehicle torque may then be calculated based on one or more of the propulsor limits, vehicle torque limits as described herein, environmental limits as described herein, or a combination thereof. Remaining vehicle torque 140 may be represented, as a non-limiting example, as a total torque available at an aircraft level, such as the remaining torque available in any plane of motion or attitude component such as pitch torque, roll torque, yaw torque, and/or lift torque.

With continued reference to FIG. 1, mixer 128 may be configured to solve at least an optimization problem, which may be an objective function. An "objective function," as used in this disclosure, is a mathematical function with a solution set including a plurality of data elements to be compared. Mixer 128 may compute a score, metric, ranking, or the like, associated with each performance prognoses and candidate transfer apparatus and select objectives to minimize and/or maximize the score/rank, depending on whether an optimal result is represented, respectively, by a minimal and/or maximal score; an objective function may be used by mixer 128 to score each possible pairing. At least an optimization problem may be based on one or more objectives, as described below. Mixer 128 may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted.

Solving at least an optimization problem may include performing a greedy algorithm process, where optimization is performed by minimizing and/or maximizing an output of objective function. A "greedy algorithm" is defined as an algorithm that selects locally optimal choices, which may or may not generate a globally optimal solution. For instance, mixer 128 may select objectives so that scores associated therewith are the best score for each goal. For instance, in non-limiting illustrative example, optimization may determine the pitch moment associated with an output of at least a propulsor based on an input.

Still referring to FIG. 1, at least an optimization problem may be formulated as a linear objective function, which mixer 128 may optimize using a linear program such as without limitation a mixed-integer program. A "linear program," as used in this disclosure, is a program that optimizes a linear objective function, given at least a constraint; a linear program maybe referred to without limitation as a "linear optimization" process and/or algorithm. For instance, in non-limiting illustrative examples, a given constraint might be torque limit, and a linear program may use a linear objective function to calculate maximum output based on the limit. In various embodiments, mixer 128 may determine a set of instructions towards achieving a user's goal that maximizes a total score subject to a constraint that there are other competing objectives. A mathematical solver may be implemented to solve for the set of instructions that maximizes scores; mathematical solver may be implemented on mixer 128 and/or another device in system 100, and/or may be implemented on third-party solver. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, mixer 128 may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

With continued reference to FIG. 1, mixer 128 may include an inertia compensator. An inertia compensator may include one or more computing devices, an electrical component, circuitry, one or more logic circuits or processors, or the like, which may configured to compensate for inertia in one or more propulsors present in system 100. Mixer 100 is configured, in general, to output signals and command propulsors to produce a certain amount of torque; however, real-world propulsors contain mass, and therefore have inertia. "Inertia", for the purposes of this disclosure, is a property of matter by which it continues in its existing state of rest or uniform motion in a straight line, unless that state is changed by an external force. Specifically, in this case, a massive object requires more force or torque to start motion than is required to continue producing torque. In a control system, mixer 128 must therefore modulate the would-be signal to account for inertia of the physical system being commanded. The inertia compensator may make appropriate calculations based on modified attitude command 132, output torque command 136, and other considerations like environmental conditions, available power, vehicle torque limits 116, among others. Inertia compensator may adjust vehicle torque limits 116 for certain periods of time wherein, for example, output torque command 136 may be allowed to overspeed a propulsor to start the propulsor's rotating physical components and then quickly step down the torque as required to maintain the commanded torque. The inertia compensator which may include a lead filter.

Mixer 128 may be configured to generate a first torque command for at least a propulsor. First torque command may include at least a torque vector. First torque command may be represented in any suitable form, which may include, without limitation, vectors, matrices, coefficients, scores, ranks, or other numerical comparators, and the like. A "vector" as defined in this disclosure is a data structure that represents one or more quantitative values and/or measures of forces, torques, signals, commands, or any other data structure as described in the entirety of this disclosure. A vector may be represented as an n-tuple of values, where n is at least two values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes. One of ordinary skill in the art would appreciate a vector to be a mathematical value consisting of a direction and magnitude.

With continued reference to FIG. 1, "torque", for the purposes of this disclosure, refers to a twisting force that tends to cause rotation. Torque is the rotational equivalent of linear force. In three dimensions, the torque is a pseudovector; for point particles, it is given by the cross product of the position vector (distance vector) and the force vector. The magnitude of torque of a rigid body depends on three quantities: the force applied, the lever arm vector connecting the point about which the torque is being measured to the point of force application, and the angle between the force and lever arm vectors. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. The direction of the torque can be determined by using the right-hand grip rule: if the fingers of the right hand are curled from the direction of the lever arm to the direction of the force, then the thumb points in the direction of the torque. One of ordinary skill in the art would appreciate that torque is represented as a vector, consistent with this disclosure, and therefore includes a magnitude of force and a direction. "Torque" and "moment" are equivalents for the purposes of this disclosure. Any torque command or signal herein may include at least the steady state torque to achieve the initial vehicle torque signal 108 output to at least a propulsor.

With continued reference to FIG. 1, system 100 includes display 144. Display 144 is configured to present, to a user, the remaining vehicle torque 140 and the output toque command 136. Display 144 may include a graphical user interface, multi-function display (MFD), primary display, gauges, graphs, audio cues, visual cues, information on a heads-up display (HUD) or a combination thereof. Display 144 may include a display disposed in one or more areas of an aircraft, on a user device remotely located, one or more computing devices, or a combination thereof. Display 144 may be disposed in a projection, hologram, or screen within a user's helmet, eyeglasses, contact lens, or a combination thereof. System 100 may include display 144 that displays remaining vehicle torque 140 to a user in graphical form. Graphical form may include a two-dimensional plot of two variables in that represent real-world data, such as pitch torque vs. roll torque of an aircraft. System 100 may include display 144 wherein the remaining vehicle torque 140 is presented to a user in a graphical representation of an electric aircraft. In a non-limiting example, a graphical representation of an electric aircraft may show arrows, levels, bar graphs, percentages, or another representation of remaining vehicle torques in a plurality of planes of motion such as pitch moment, roll moment, yaw moment, and lift force, individually or collectively. Remaining vehicle torque 140 may include remaining vehicle torque capability in an aircraft's pitch moment. Remaining vehicle torque 140 may include the remaining vehicle torque capability in an aircraft's roll moment.

Figure 2:
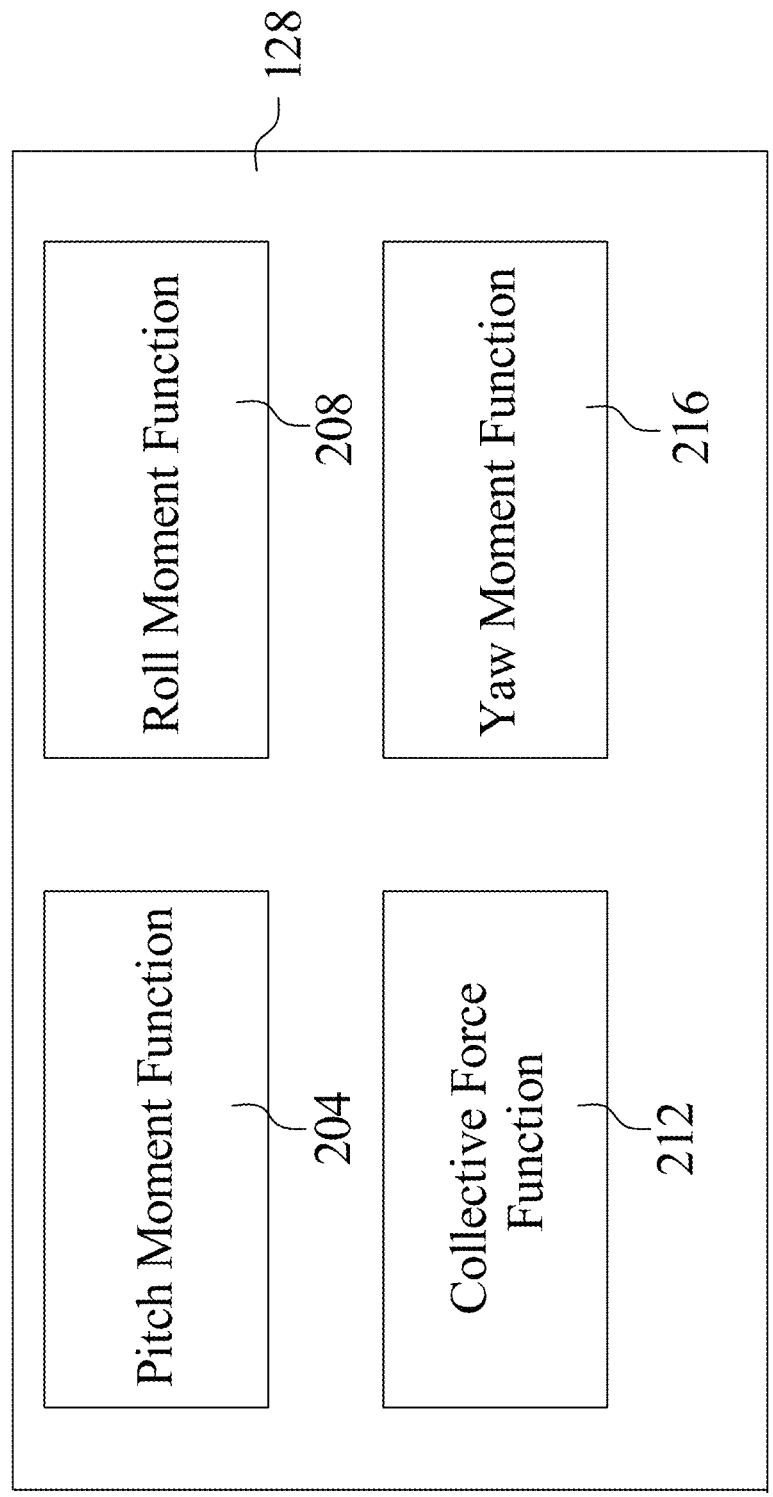
FIG. 2 is a block diagram illustrating an exemplary embodiment of a mixer and sequential problems solved therein.

Referring now to FIG. 2, mixer 128 is presented. As previously disclosed, solving at least an optimization problem may include solving sequential problems relating to vehicle-level inputs to at least a propulsor, namely pitch, roll, yaw, and collective force. Mixer 128 may solve at least an optimization problem in a specific order. An exemplary sequence is presented here in FIG. 2. According to exemplary embodiments, mixer 128 may solve at least an optimization problem wherein the at least an optimization problem includes a pitch moment function 204; optimization problem may be a nonlinear program. Solving may be performed using a nonlinear program and/or a linear program. Mixer 128 may solve at least an optimization problem wherein solving at least an optimization program may include solving a roll moment function 208 utilizing a nonlinear program to yield the desired amount of roll moment as a function of the desired amount of pitch moment. Mixer 128 may solve at least an optimization problem wherein solving at least an optimization program may include solving a collective force function 212 utilizing a nonlinear program to yield the desired amount of collective force as a function of the desired amount of pitch moment and the desired amount of roll moment. Mixer 128 may solve at least an optimization problem wherein solving at least an optimization program may include solving a yaw moment function 216 utilizing a nonlinear program to yield the desired amount of yaw moment, as a function of the desired amount of pitch moment, the desired amount of roll moment, and the desired amount of collective force. One of ordinary skill in the art, after reading the entirety of this disclosure, will appreciate that any force program may be implemented as a linear or non-linear program, as any linear program may be expressed as a nonlinear program.

Referring now to FIG. 3A, torque allocator 300 is presented in graphical form. Torque allocator 300 may be disposed fully or partially within mixer 128 as disclosed herein. Torque allocator 300 may include one or more computing devices as described herein. Torque allocator 300 may be a separate component or grouping of components from those described herein. Torque allocator 300 may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component is relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process is then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this is projecting the closest possible value for the third-level attitude command (roll in this example). This process would repeat again for the third and fourth attitude components, in this non-limiting example, roll and yaw attitude control components. Since roll is prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, FIG. 3A illustrates a pitch axis 304 and lift axis 308. Pitch axis 304 represents the command or plurality of attitude commands 112 inputted to mixer 128 as described herein. Pitch axis 304 may be conditioned or altered to be inputted to mixer 128. For example, and without limitation, initial vehicle torque signal 108 may include pitch and lift commands within plurality of attitude commands 112. Torque allocator 300 may also receive at least a vehicle torque limit 312, which may be represented without limitation by a box plotted within the pitch and lift axes, which may be the same as or similar to at least a vehicle torque limit 116. A point where pitch command and lift command intersect may represent initial vehicle torque signal 316 as projected onto exemplary graph of pitch and lift axes, which may be the same or similar to initial vehicle torque signal 108 as disclosed in the entirety of this disclosure. Torque allocator 300 utilizes prioritization data as described in the entirety of this disclosure to solve this two-dimensional problem by preserving the higher priority command and sacrificing the lower priority command. This prioritization preservation process may be illustrated, as a non-limiting example by placement of modified attitude command 320, wherein the pitch command was preserved (horizontally translated and therefore unchanged from the initial command), while the lift command was lessened to bring the modified attitude command within vehicle torque limits 312 (the box). Modified attitude command 328, as discussed in the entirety of this disclosure, may be further combined, modified, conditioned, or otherwise adjusted to produce output torque command 136 to the plurality of propulsors. Remaining vehicle torque 328 represents the remaining torque capability in one or more propulsors before, during, and after an aircraft maneuver. Remaining vehicle torque 328 may include an individual propulsor's remaining torque capability, one or more of pitch, roll, yaw, and lift, capabilities of one or more propulsors, the remaining vehicle-level torque or power for subsequent maneuvers. Remaining vehicle torque 328 may be displayed to a pilot or user in the graphic presented here in FIG. 3A. The above-described is a non-limiting example of one step in the torque allocation process. For example.

Figure 3:
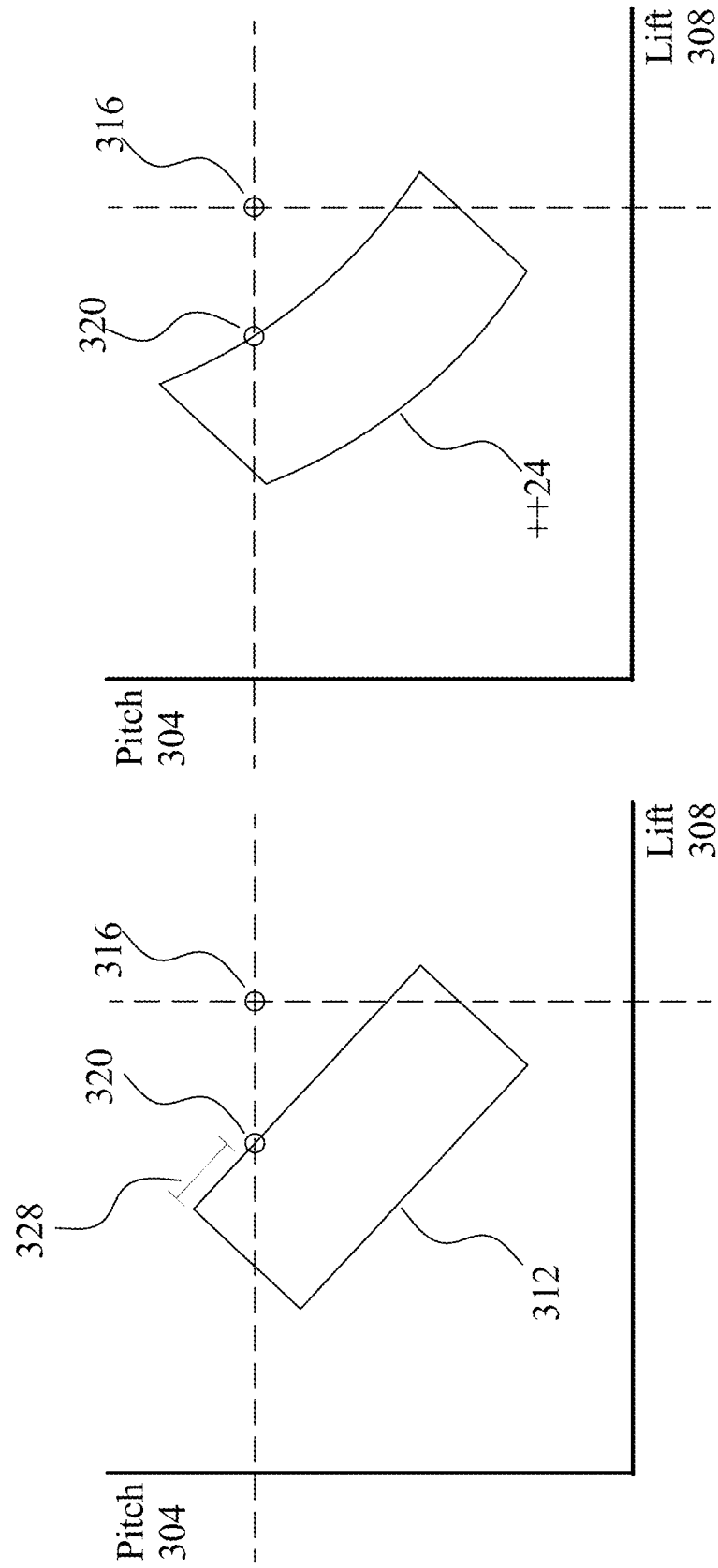
FIGS. 3A and 3B are graphical representations illustrating the herein disclosed system for torque allocation in an electric aircraft, without and with inertial compensation, respectively.

Referring now to FIG. 3B, torque allocator 300 is again presented in graphical form of a two-dimensional plot of pitch vs. lift with inertia compensation. Torque allocator 300 is presented in graphical form. Torque allocation process may be similar, or the same process as described above in regard to FIG. 3A, with the torque limits adjusted for inertia compensation. Torque allocator 300 may be disposed fully or partially within mixer 128 as disclosed herein. Torque allocator 300 may include one or more computing devices as described herein. Torque allocator 300 may be a separate component or grouping of components from those described herein. FIG. 3 includes pitch axis 304 and lift axis 308. Pitch axis 304 represents the command or plurality of attitude commands 112 inputted to mixer 128 as described herein. Pitch axis 304 may be conditioned or altered to be inputted to mixer 128. For example, and without limitation, initial vehicle torque signal 108 may include pitch and lift commands within plurality of attitude commands 112. Torque allocator 300 also receives at least a vehicle torque limit 324 represented by the box plotted within the pitch and lift axes, which may be the same as, or similar to at least a vehicle torque limit 116. Here in FIG. 3B, instead of the box being made of straight linear sides, the inertia compensation as previously discussed creates curved limits, wherein certain plurality of attitude commands 112 may be allowed whereas without inertia compensation they would be outside of the limits represented by the rectangle in FIG. 3A. Where the pitch command and lift command intersect is the initial vehicle torque signal 316, which may be the same or similar to initial vehicle torque signal 108 as disclosed in the entirety of this disclosure. Torque allocator 300 utilizes prioritization data as described in the entirety of this disclosure to solve this two-dimensional problem by preserving the higher priority command and sacrificing the lower priority command. This prioritization preservation process is shown by the placement of modified attitude command 320, wherein the pitch command was preserved (horizontally translated and therefore unchanged from the initial command), while the lift command was lessened to bring the modified attitude command within vehicle torque limits 324 (the box). Modified attitude command 328 effectively commands the amount of torque to one or more propulsors to accomplish the closest vehicle level torque to initial vehicle torque signal 108 as possible given certain limits, maneuvers, and aircraft conditions. Modified attitude command 328, as discussed in the entirety of this disclosure, may be further combined, modified, conditioned, or otherwise adjusted to produce output torque command 136 to the plurality of propulsors. Remaining vehicle torque 328 represents the remaining torque capability in one or more propulsors before, during, and after an aircraft maneuver. Remaining vehicle torque 328 may include an individual propulsor's remaining torque capability, one or more of pitch, roll, yaw, and lift, capabilities of one or more propulsors, the remaining vehicle-level torque or power for subsequent maneuvers. Remaining vehicle torque 328 may be displayed to a pilot or user in the graphic presented here in FIG. 3A.

Figure 4:
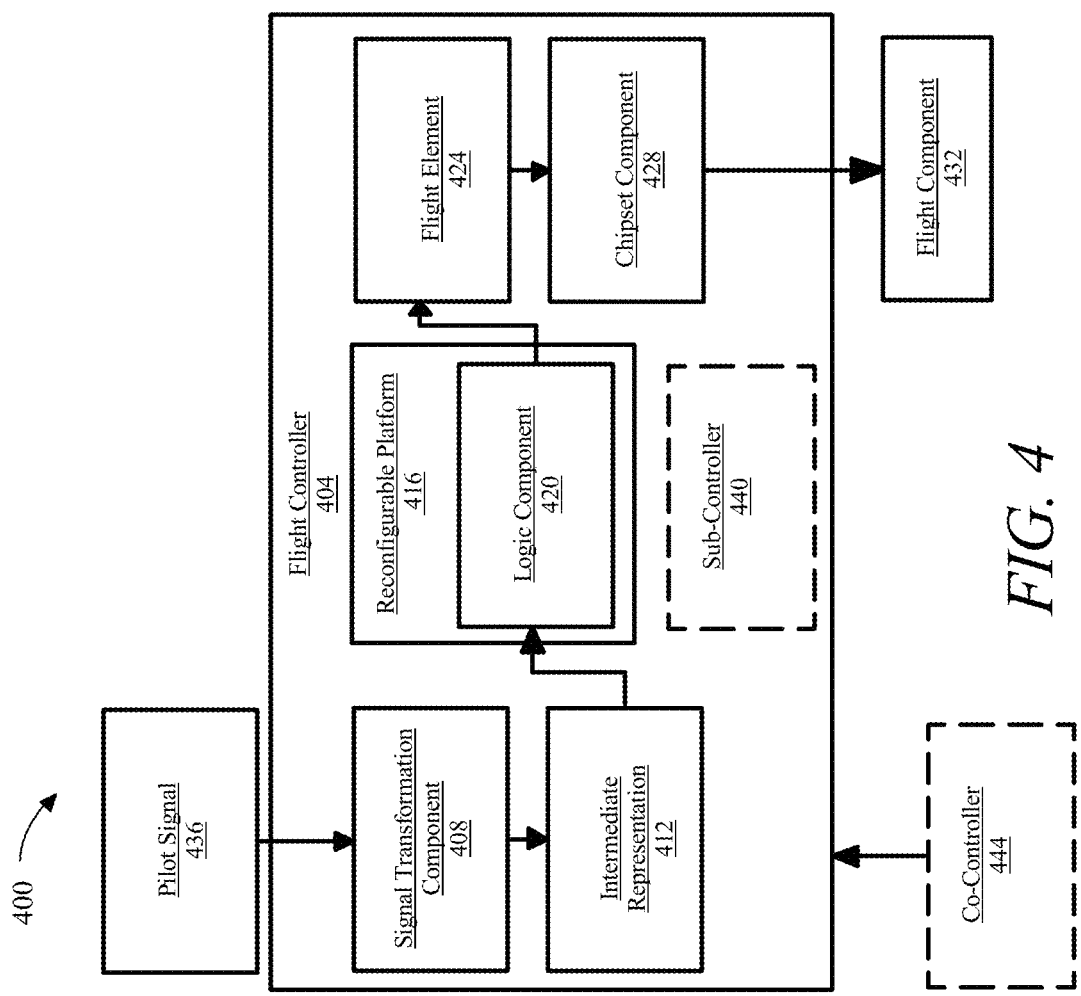
FIG. 4 is a block diagram of an exemplary flight controller.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. In another non-limiting example semi-autonomous mode may permit a pilot's operation within an acceptable control range, such that if pilot controls input values outside of the acceptable control range flight controller will operate independent (autonomously) from the pilot controls. As used in this disclosure "non-autonomous mode" is a mode that denotes a pilot will control aircraft and/or maneuvers of aircraft in its entirety.

In some embodiments, and still referring to FIG. 4, semi-autonomous mode may include an autonomous mode that is overridable by a user, for example a pilot. For example in some embodiments, flight controller 404 may operate in a semi-autonomous mode wherein the aircraft is fully controlled in an autonomous mode, but also is responsive to pilot control inputs as received. In another embodiment, flight controller may operate in a semi-autonomous mode wherein pilot is displayed or otherwise communicated a range of controls within which flight controller deems an acceptable control range and pilot remains in complete control of aircraft, but through communication of the acceptable control range the flight controller 404 may be said to be operating within a semi-autonomous mode.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
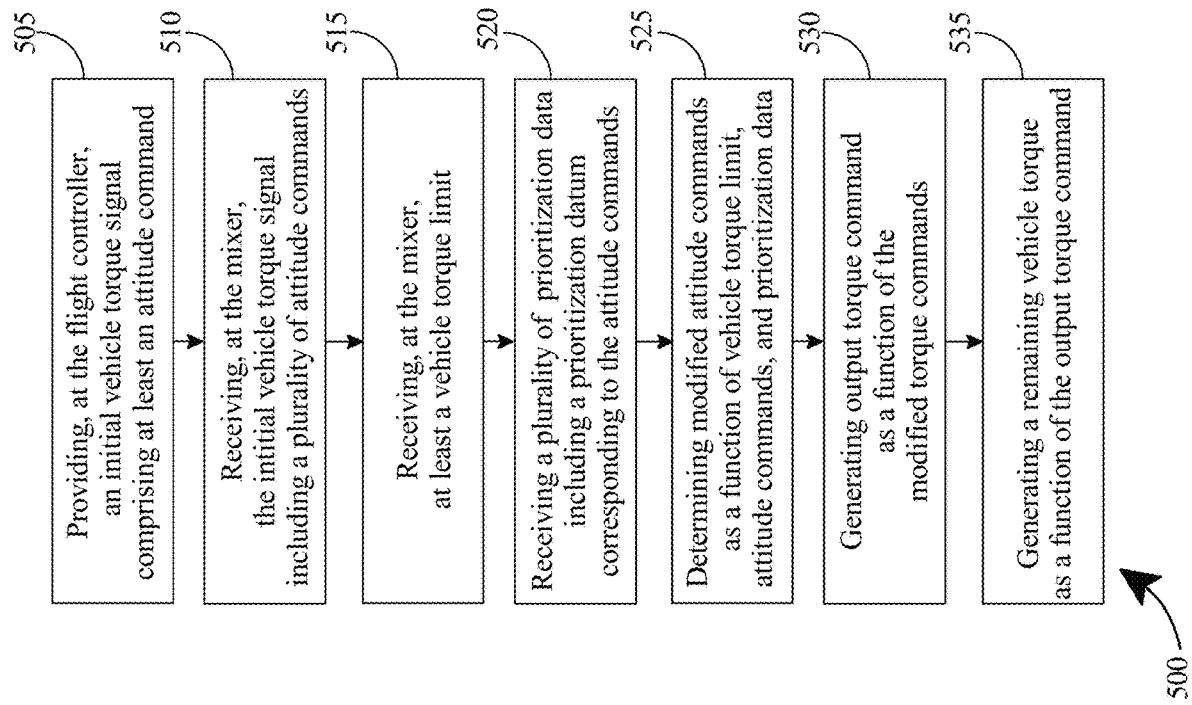
FIG. 5 is a flow chart of an exemplary embodiment of a method of flight control in electric aircraft.

Referring now to FIG. 5, a method 500 is presented in flow diagram form for flight control configured for use in an electric aircraft. At 505, method 500 includes providing, at the flight controller, an initial vehicle torque signal including a plurality of attitude commands. The flight controller may be any flight controller as described herein. The initial vehicle torque signal may be any initial vehicle torque signal as described herein. The plurality of attitude commands may include any attitude commands as described herein. The flight controller may include a proportional-integral-derivative (PID) controller. In some embodiments, providing initial vehicle torque signal may additionally include providing, using flight controller, the initial vehicle torque signal as a function of a control algorithm. In some embodiments, providing initial vehicle torque signal may additionally include providing, using flight controller, the initial vehicle torque signal as a function of an autonomous function.

At 510, method 500 includes receiving, at the mixer, the initial vehicle torque signal including a plurality of attitude commands. The mixer may be any mixer as described herein. The mixer may include an inertia compensator as described herein. The inertia compensator may include a lead filter, as described herein. The mixer may include an electrical logic circuit as described herein. The mixer may include a processor as described herein. The initial vehicle torque signal may include any initial vehicle torque signal as described herein.

At 515, method 500 includes receiving, at the mixer, at least a vehicle torque limit. The at least a vehicle torque limit may include any vehicle torque limit as described herein, including but not limited to individual propulsor limits, vehicle-level attitude limits, collective propulsor torque limits, and collective torque lift force limits, among others.

At 520, method 500 includes receiving a plurality of prioritization data including a prioritization datum corresponding to the plurality of attitude commands. The prioritization data may be any prioritization described herein. The prioritization datum may include any prioritization datum as described herein. The plurality of attitude commands may include any of the plurality of attitude commands as described herein.

At 525, method 500 includes determining modified attitude commands as a function of the at least a vehicle torque limit, plurality of attitude commands, and prioritization data. The at least a vehicle torque limit may be any vehicle torque limit as described herein. The plurality of attitude commands may include any of the plurality of attitude commands as described herein. The prioritization data may include any prioritization data as described herein.

At 530, method 500 includes generating, at the mixer, an output torque command as a function of the modified torque commands. The output torque command may include any output torque command as described herein. The modified torque commands may include any modified torque commands as described herein.

At 535, method 500 includes generating, at the mixer, a remaining vehicle torque as a function of the output torque command. Remaining vehicle torque may include any remaining vehicle torque as described herein. The output torque command may include any output torque command as described herein. The remaining vehicle torque may include the remaining vehicle torque capability in an aircraft's yaw moment. The remaining vehicle torque may include the remaining vehicle torque capability in an aircraft's assisted lift.

Figure 6:
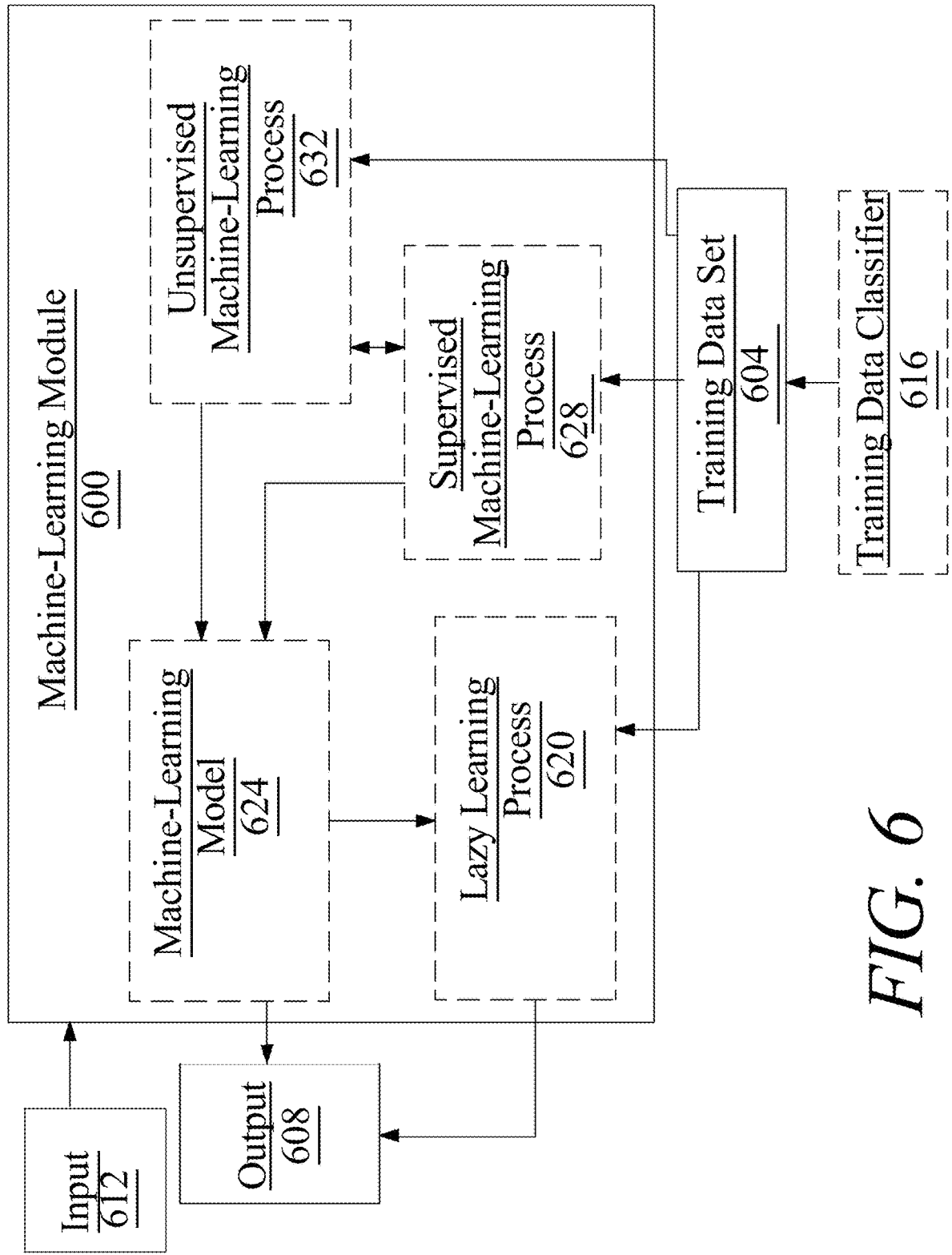
FIG. 6 is a block diagram illustrating an exemplary embodiment of a machine-learning process.

Any of the herein disclosed system and methods may be implemented using machine-learning. Referring now to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example machine-learning process may input user preferences and candidate transfer apparatus performance archive 124 and output a ranking of performance prognoses.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to only correlate performance prognoses to candidate transfer apparatuses for transfer apparatuses capable of completing a transfer invocation, similarly to a cohort of persons and/or other analyzed items and/or phenomena for which a subset of training data may be selected.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 642. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 6, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 604.

Figure 7:
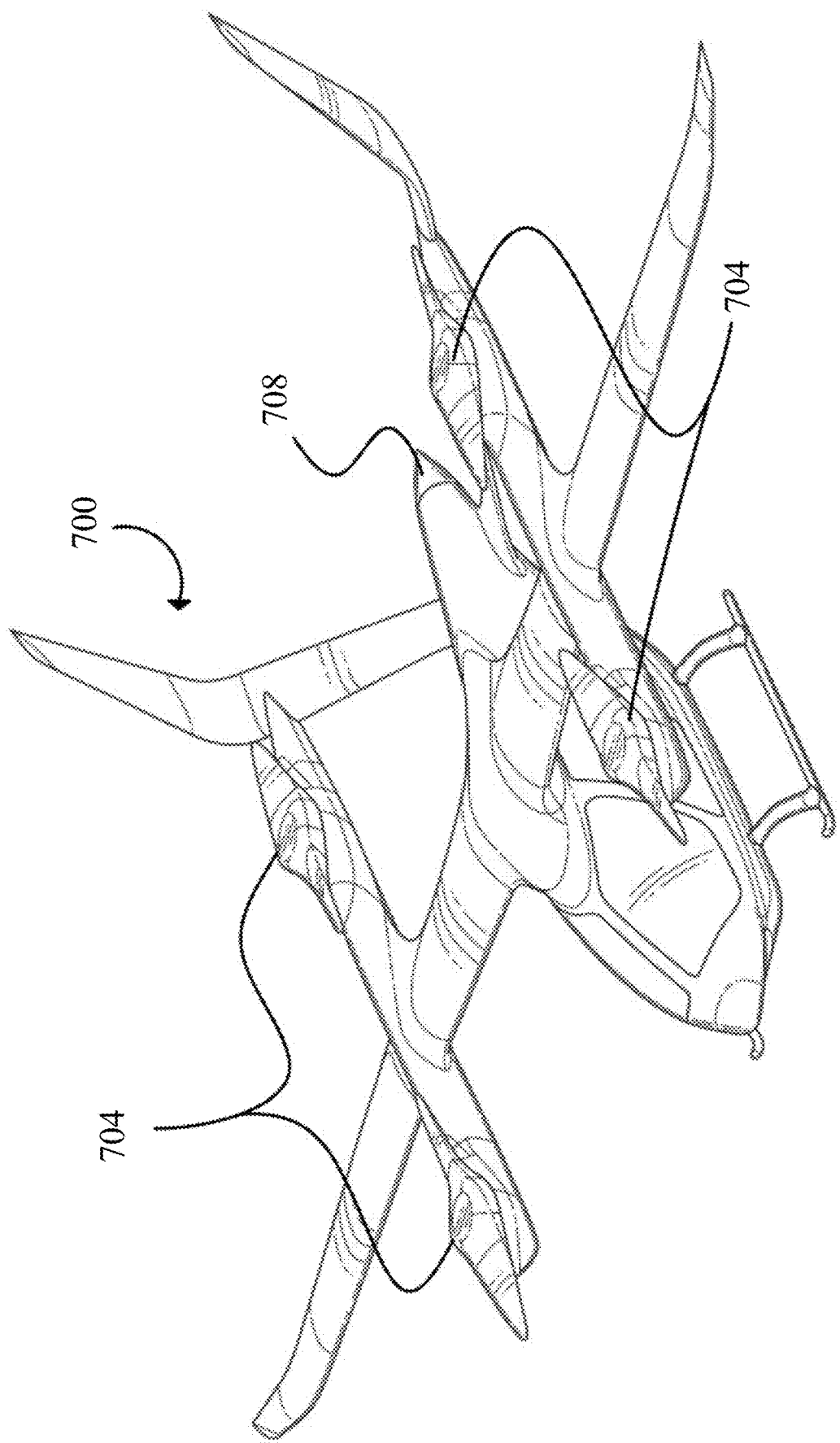
FIG. 7 is an illustration of an embodiment of an electric aircraft.

Referring now to FIG. 7, an embodiment of an electric aircraft 700 is presented. Still referring to FIG. 7, electric aircraft 700 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 7, a number of aerodynamic forces may act upon the electric aircraft 700 during flight. Forces acting on an electric aircraft 700 during flight may include, without limitation, thrust, the forward force produced by the rotating element of the electric aircraft 700 and acts parallel to the longitudinal axis. Another force acting upon electric aircraft 700 may be, without limitation, drag, which may be defined as a rearward retarding force which is caused by disruption of airflow by any protruding surface of the electric aircraft 700 such as, without limitation, the wing, rotor, and fuselage. Drag may oppose thrust and acts rearward parallel to the relative wind. A further force acting upon electric aircraft 700 may include, without limitation, weight, which may include a combined load of the electric aircraft 700 itself, crew, baggage, and/or fuel. Weight may pull electric aircraft 700 downward due to the force of gravity. An additional force acting on electric aircraft 700 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 700 are designed to be as lightweight as possible.

Reducing the weight of the aircraft and designing to reduce the number of components is essential to optimize the weight. To save energy, it may be useful to reduce weight of components of an electric aircraft 700, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 700 and/or propulsors.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
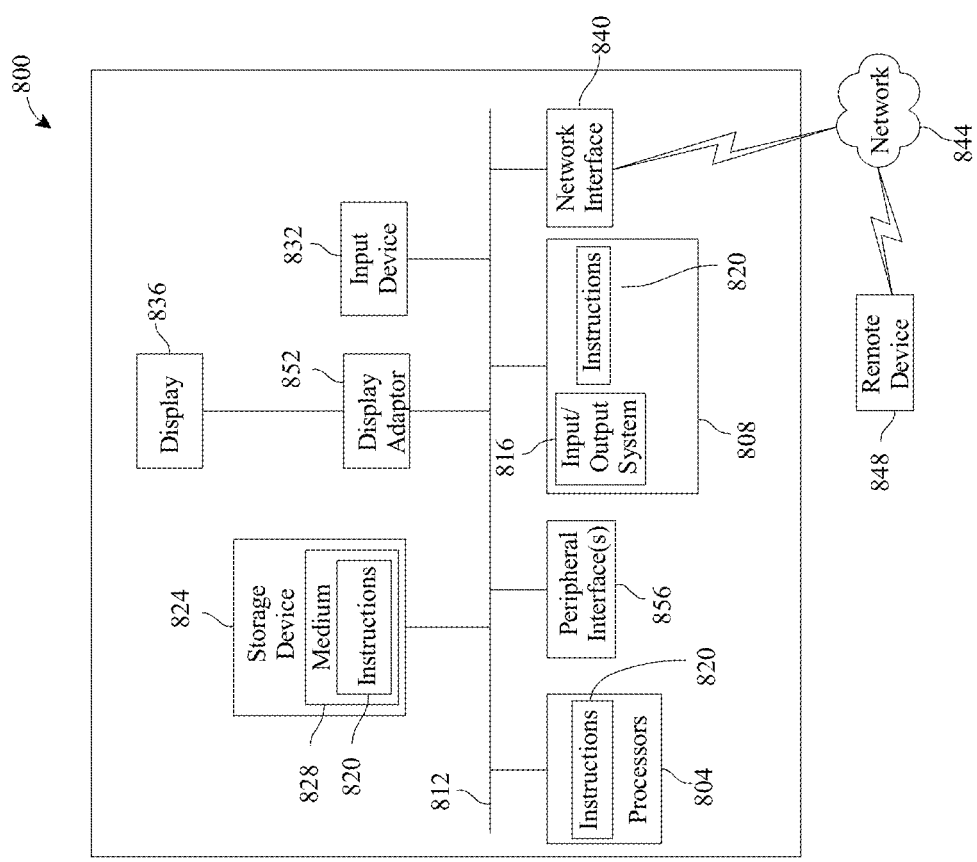
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 815 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 835, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 835. Examples of a display device include, but are not limited to, a liquid crystal display (LCD), a cathode ray tube (CRT), a plasma display, a light emitting diode (LED) display, and any combinations thereof. Display adapter 852 and display device 835 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 855. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for flight control in electric aircraft, the system comprising:
   a flight controller, wherein the flight controller is configured to provide an initial vehicle torque signal comprising a plurality of attitude commands;
   a mixer, wherein the mixer includes circuitry configured to:
      receive the initial vehicle torque signal;
      receive at least a vehicle torque limit;
      receive a plurality of prioritization data, the plurality of prioritization data including a prioritization datum corresponding to each of the plurality of attitude commands;
      determine a plurality of modified attitude commands as a function of the at least a vehicle torque limit, the plurality of attitude commands, and the plurality of prioritization data;
      generate, as a function of the plurality of modified attitude commands, an output torque command, wherein the output torque command includes the initial vehicle torque signal adjusted as a function of the at least a vehicle torque limit; and
      generate, as a function of the output torque command, a remaining vehicle torque.

2. The system of claim 1, wherein the mixer comprises an inertia compensator.

3. The system of claim 2, wherein the inertia compensator comprises a lead filter.

4. The system of claim 1, wherein the mixer is implemented using an electrical logic circuit.

5. The system of claim 1, wherein the mixer is implemented using a processor.

6. The system of claim 1, wherein the flight controller is a proportional-integral-derivative (PID) controller.

7. The system of claim 1, wherein the flight controller is configured to provide the initial vehicle torque signal as a function of a control algorithm.

8. The system of claim 1 wherein the flight controller is configured to provide the initial vehicle torque signal as a function of an autonomous function.

9. The system of claim 1, wherein the remaining vehicle torque comprises the remaining vehicle torque capability in an aircraft's pitch moment.

10. The system of claim 1, wherein the remaining vehicle torque comprises the remaining vehicle torque capability in an aircraft's roll moment.

11. A method for flight control in electric aircraft, the method comprising:
   providing, at a flight controller, an initial vehicle torque signal comprising at least an attitude command;
   receiving, at a mixer, the initial vehicle torque signal including a plurality of attitude commands;
   receiving, at the mixer, at least a vehicle torque limit;
   receiving, at the mixer, a plurality of prioritization data including a prioritization datum corresponding to each of the plurality of attitude commands;
   determining, at the mixer, a plurality of modified attitude commands as a function of the at least a vehicle torque limit, the plurality of attitude commands, and the plurality of prioritization data;
   generating, at the mixer, as a function of the plurality of modified attitude commands, an output torque command, wherein the output torque command includes the initial vehicle torque signal adjusted as a function of the at least a vehicle torque limit; and
   generating, at the mixer, as a function of the output torque command, a remaining vehicle torque.

12. The method of claim 11, wherein the mixer comprises an inertia compensator.

13. The method of claim 12, wherein the inertia compensator comprises a lead filter.

14. The method of claim 11, wherein the mixer is implemented using an electrical logic circuit.

15. The method of claim 11, wherein the mixer is implemented using a processor.

16. The method of claim 11, wherein the flight controller is a proportional-integral-derivative (PID) controller.

17. The method of claim 11, wherein providing the initial vehicle torque signal further comprises:
   providing, using the flight controller, the initial vehicle torque signal as a function of a control algorithm.

18. The method of claim 11, wherein providing the initial vehicle torque signal further comprises:
   providing, using the flight controller, the initial vehicle torque signal as a function of an autonomous function.

19. The method of claim 11, wherein the remaining vehicle torque comprises the remaining vehicle torque capability in an aircraft's yaw moment.

20. The method of claim 11, wherein the remaining vehicle torque comprises the remaining vehicle torque capability in an aircraft's assisted lift.

* * * * *